US006901693B1

(12) United States Patent
Crowe (10) Patent No.: US 6,901,693 B1
(45) Date of Patent: Jun. 7, 2005

(54) MOTORIZED GAME DECOY

(75) Inventor: Claude M. Crowe, Sterlington, LA (US)

(73) Assignee: Huntwise, Inc., Monroe, LA (US)

( * ) Notice: Subject to any disclaimer, the term of this patent is extended or adjusted under 35 U.S.C. 154(b) by 0 days.

(21) Appl. No.: 10/305,712

(22) Filed: Nov. 27, 2002

(51) Int. Cl.$^7$ ............................................. A01M 31/06
(52) U.S. Cl. .......................................................... 43/2
(58) Field of Search .................................. 43/2, 3, 26.1

(56) References Cited

U.S. PATENT DOCUMENTS

| | | | | |
|---|---|---|---|---|
| 2,480,390 | A | * | 8/1949 | Thompson ........................ 43/3 |
| 3,350,808 | A | * | 11/1967 | Mitchell ............................ 43/3 |
| 3,916,553 | A | * | 11/1975 | Lynch et al. ...................... 43/3 |
| 4,773,178 | A | | 9/1988 | Marek |
| 4,852,288 | A | | 8/1989 | Payne et al. |
| 4,867,730 | A | | 9/1989 | Lee |
| 5,029,408 | A | | 7/1991 | Smith |
| 5,036,614 | A | | 8/1991 | Jackson |
| 5,233,780 | A | * | 8/1993 | Overholt ........................... 43/2 |
| 5,289,654 | A | * | 3/1994 | Denny et al. ..................... 43/2 |
| 5,546,692 | A | * | 8/1996 | Byers ................................ 43/2 |
| 5,632,110 | A | * | 5/1997 | Roy ................................... 43/2 |
| 5,791,081 | A | * | 8/1998 | Turner et al. ..................... 43/2 |
| 5,826,364 | A | * | 10/1998 | Bitting ............................... 43/2 |
| 5,884,427 | A | | 3/1999 | Lenz |
| 6,021,594 | A | * | 2/2000 | Krueger ............................ 43/2 |
| 6,070,356 | A | * | 6/2000 | Brint et al. ....................... 43/2 |
| 6,092,322 | A | * | 7/2000 | Samaras ........................... 43/2 |
| 6,532,693 | B2 | * | 3/2003 | Sides ................................ 43/2 |
| 6,684,552 | B1 | * | 2/2004 | Anders, III ....................... 43/3 |
| 2002/0162268 | A1 | * | 11/2002 | Fulcher ............................. 43/3 |

OTHER PUBLICATIONS

Finisher motion deer, Higdon Decoys Online Store, www.higdondecoys.com.

* cited by examiner

*Primary Examiner*—Darren W. Ark
(74) *Attorney, Agent, or Firm*—Kean, Miller, Hawthorne, D'Armond, McCowan & Jarman, LLP (57) ABSTRACT

An improved motorized decoy is provided for attracting and holding the attention of a live game animal by simulating the appearance, movements, sounds, and smells of a live game animal or an animal that is native to the habitat of a selected game animal. The decoy includes a decoy body that may be bifurcated into a forward portion and a rear portion, one or more motors, and an optional support member. Together, the motors may produce, either individually or in combination, the following movements: (1) movement of the entire decoy body relative to a fixed ground position, (2) movement of the head and neck portion of the decoy body relative to the rear portion of the decoy body, (3) movement of the ears relative to the head and neck portion, (4) movement of the tail relative to the rear portion, and (5) movement of one or more legs relative to the rear portion. All of the above movements may be produced randomly and/or intermittently by virtue of a programmable modulator or a multi-cycle remote control. All of the above movements may also be produced in sequential order by virtue of a multi-cycle remote control. Additional features include detachable antlers, detachable genitalia, and a scent disperser for distributing a chemical attractant. The invention also includes a method for attracting a game animal to a target area.

73 Claims, 8 Drawing Sheets

MOTORIZED GAME DECOY

CROSS-REFERENCE TO RELATED APPLICATION

Not applicable.

BACKGROUND OF THE INVENTION

1. Field of the Invention

This invention relates, generally, to motorized game decoys, and in particular to a motorized game decoy designed attract wild game by simulating the appearance, movements, sounds, and smells of live game animals.

2. Description of Related Art

Wild game decoys are used by hunters to attract wild game, thereby increasing the hunter's chances of viewing, trapping, and/or shooting a wild game animal. Traditional hunting techniques employ the use of wild game decoys that merely simulate the physical appearance of a wild game animal. Such decoys have achieved limited success when used to attract winged game animals, such as ducks and doves, but are generally not as successful when used to attract more discerning and attentive game, such as deer, moose, elk, caribou, wild turkey, and pronghorn antelope. In order to attract game animals of the latter type, the selected decoy should simulate the appearance, movement, sounds, and smells of a live game animal. Alternatively, the selected decoy should simulate the appearance, movement, sounds, and smells of an animal that commonly appears in the natural habitat of the selected game animal.

Live game animals, and in particular deer and similar ungulate game animals, are unlike humans in that they are generally given to quiet, contemplative, and intermittent movements interspersed with periods of non-movement. Such animals also keenly sense the movements of other animals and have an exceptionally keen sense of smell. Therefore, decoys that do not move or do not emulate animal movement in a realistic manner, will drive game animals away rather than attract them to a target area.

A number of inventions have been developed to attract discerning wild game. For example, known prior art includes U.S. Pat. Nos. 4,733,178, 5,546,692, 5,791,081, 5,826,364, 5,884,427, 6,021,594, 6,070,356, and 6,092,322. Of the above decoys, U.S. Pat. Nos. 4,773,178 and 5,826,364 are static decoys and thus do not involve the use of motion to attract a game animal. The rest of the aforementioned prior art decoys use motion to attract a particular game animal, but largely fail to achieve realistic game animal movement.

What is needed is a wild game decoy that overcomes the shortfalls of the devices that are currently known in the prior art. In particular, what is needed is an improved wild game decoy that simulates the appearance, movement, sounds, and smells of a live game animal. Although the desired decoy may simulate the type of game animal desired to be attracted, the game decoy should optionally simulate an animal that would commonly be found in the habitat of a selected game animal, including without limitation an armadillo, fox, coyote, or opossum.

OBJECTS OF THE INVENTION

It is an object of the present invention to provide an improved motorized game decoy that simulates the appearance, movement, sounds, and smells of a live game animal.

Another object of the present invention is to provide an improved motorized decoy that may produce a plurality of movements for the purpose of attracting and holding the attention of a selected game animal.

SUMMARY OF THE INVENTION

An improved motorized game decoy is provided for attracting and holding the attention of a live game animal by simulating the appearance, movements, sounds, and smells of a live game animal or an animal that is native to the habitat of a selected game animal. The decoy includes a decoy body, which simulates the body of a selected game animal or an animal that is commonly found in the habitat of the selected game animal. The decoy body may be hollow and may be bifurcated into a forward portion (neck/head portion) and a rear portion, with the forward and rear portions being hingedly connected to allow horizontal or vertical head movement of the decoy body. The forward portion may additionally include rotatable ears, and the rear portion may include an animated tail and at least one moveable leg appendage.

One of the functions of the disclosed decoy is to provide realistic animal appearance and movement. Decoy animation is accomplished using a plurality of internally and/or externally mounted motors, which may be remotely operated. The motors may be gear motors, which operate using gears and maintain the motor shaft in a static position once the motor has been deactivated, or direct drive motors, which allow the drive shaft(s) to rotate freely upon motor deactivation, depending upon the type of motion desired by the hunter. Together, the motors may produce, either individually or in combination, the following types of movement: (1) movement of the entire decoy body relative to a fixed position on the ground, (2) movement of the entire head and neck portion of the decoy body relative to the remaining rear portion of the decoy body, (3) movement of the ears, (4) movement of the tail, and (5) movement of at least one leg relative to the rear portion. All of the above movements may be produced randomly and/or intermittently by virtue of a programmable modulator or a multi-cycle remote control, thereby simultaneously preventing the wild game from noticing the hunter and drawing the game to within shooting distance.

In one embodiment, the forward portion of the decoy body is hingedly connected to the rear portion at the interface of the forward and rear portions using brackets and a transverse rod. The brackets and transverse rod may be aligned in the vertical direction to allow horizontal movement of the forward portion. Alternatively, the transverse rod and brackets may be aligned in the horizontal direction to allow movement of the forward portion in the vertical direction. A flexible neck cover may be attached to the decoy to conceal the interface between the forward and rear portions.

The rear portion of the decoy body may be anchored directly to the ground or rotatably mounted on a support member rigidly fixed in the vertical direction. The support member pierces the underbelly of the rear portion of the decoy body and is attached to a soil auger or other penetrating member at its lower end.

Movements of the head and neck and of the rear portion of the decoy may be accomplished using two individual motors or a single motor. Regardless of whether one or two motors are used, the selected motor drives a rotary arm connected to one or more extension rods, which alternately push and pull the head and neck portion about the hinged connection as well as the rear portion about the support member.

Movement of the ears and tail may be accomplished using individual direct drive motors. Ear movement may be achieved using a direct drive motor with a motor shaft protruding from each end of the motor (each end of the motor shaft may actually be part of the same shaft extending all the way through the direct drive motor), with a simulated ear attached to each motor shaft. Movement of the tail may be achieved using a direct drive motor with a motor shaft extending from only one end of the motor, with a simulated tail attached to the single motor shaft. Alternatively, movement of the tail may be accomplished using a cable wound about an axial pin to flip the tail into an upright position or to flip the tail horizontally from one side of the decoy to the other.

In a further embodiment, at least one of the legs of the decoy may be hinged in one or more places along its length and fitted with a mechanism for actuating the leg to produce a pawing effect. Movement of the leg or legs may be induced by an additional motor located near the lower inside surface of the rear portion of the decoy body.

An alternative embodiment of the present invention includes a multi-cycle remote control to stimulate individual movement of the head and neck, the body relative to the ground surface, the tail, the ears, or at least one leg appendage.

Another embodiment of the present invention includes a multi-cycle remote control to stimulate simultaneous movement of the head and neck, the body relative to the ground surface, the tail, the ears, at least one leg appendage, or any combination of the above.

Another embodiment of the present invention includes a modulator to stimulate individual movement of the head and neck, the body relative to the ground surface, the tail, the ears, or at least one leg appendage.

Another embodiment of the present invention includes a modulator to stimulate simultaneous movement of the head and neck, the body relative to the ground surface, the tail, the ears, at least one leg appendage, or any combination of the above.

Another embodiment of the present invention includes the use of a remote control, a modulator, or both to produce sequential movement of the head and neck, the body relative to the ground surface, the tail, the ears, at least one leg appendage, or any combination thereof.

An alternative embodiment of the invention includes the addition of a scent wick or similar apparatus for dispersing chemical animal attractant in the vicinity of the decoy.

Another embodiment of the present invention allows the user to alter the genitalia and/or sex of the decoy to suit hunting needs.

These and other objects, advantages, and features of this invention will be apparent from the following description.

DETAILED DESCRIPTION OF THE INVENTION

Figure 1:
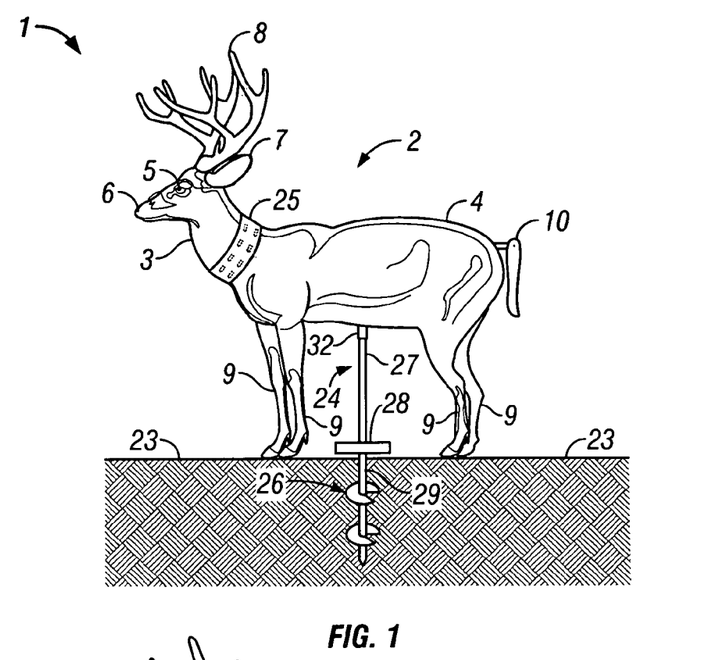
FIG. 1 is a side view of one embodiment of the forward and rear portions of the decoy.

With reference to FIGS. 1–11, an embodiment of the improved motorized game decoy will now be described. As shown in FIG. 1, decoy 1 comprises a decoy body 2, which may simulate a selected game animal, including without limitation a deer, moose, elk, caribou, or pronghorn antelope. Alternatively, decoy body 2 may simulate an animal commonly found in the habitat of a selected game animal, including without limitation an armadillo, opossum, fox, or coyote. For ease of reference, the drawings and the specification describe decoy body 2 as simulating a deer or similar ungulate animal. However, the present invention should be understood not to be limited only to animals of the family Cervidae, but should be construed to extend to any decoy having the elements disclosed in the instant application.

Figure 2:
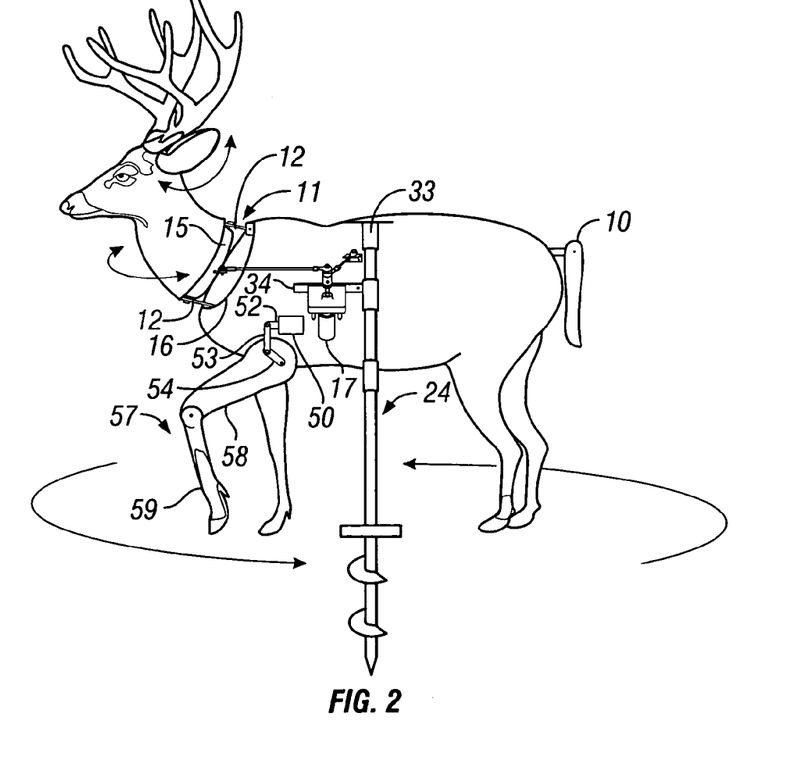
FIG. 2 is a side view of one embodiment of the decoy depicting the details of the forward portion interface, the rear portion interface, the decoy legs, and the motors responsible for imparting movement to the respective portions.
Figure 4:
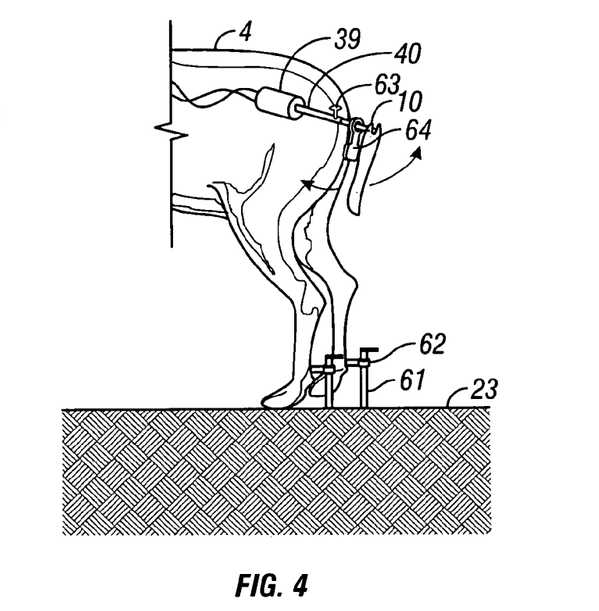
FIG. 4 is an additional perspective view of the rear portion of the decoy depicting details of the tail assembly.
Figure 4A:
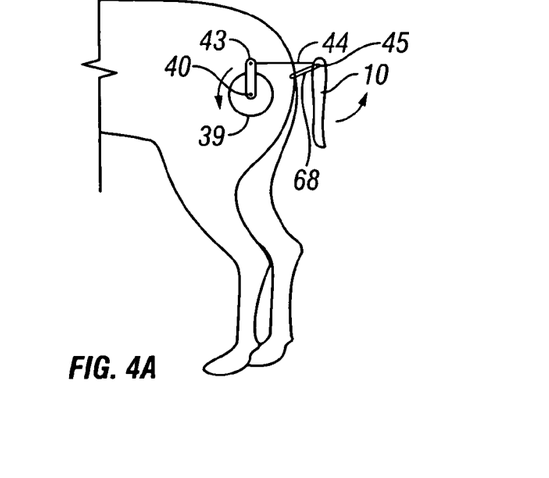
FIG. 4A is an additional perspective view of the rear portion of the decoy depicting a further embodiment of the tail assembly.
Figure 5:
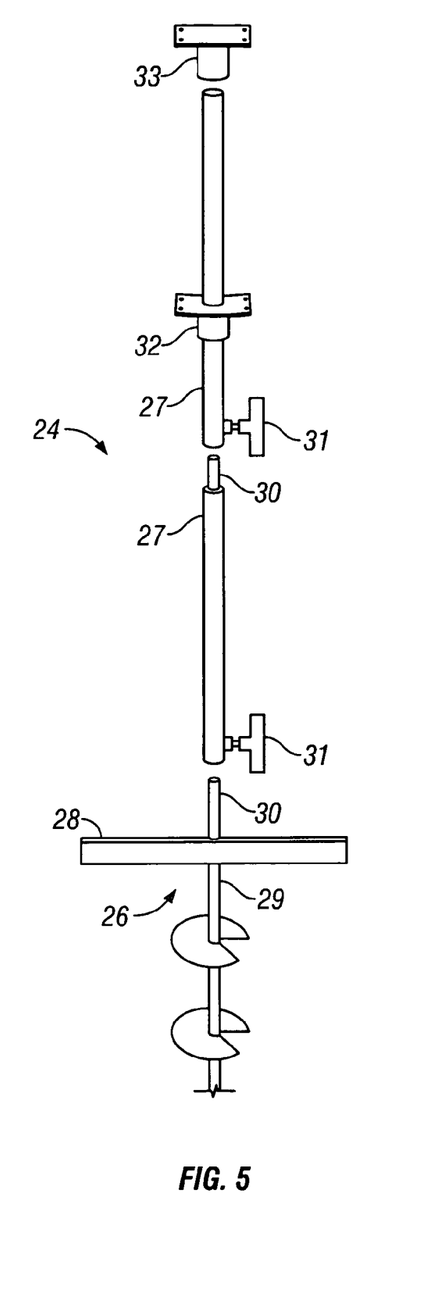
FIG. 5 is a side view of one embodiment of the support member.
Figure 5A:
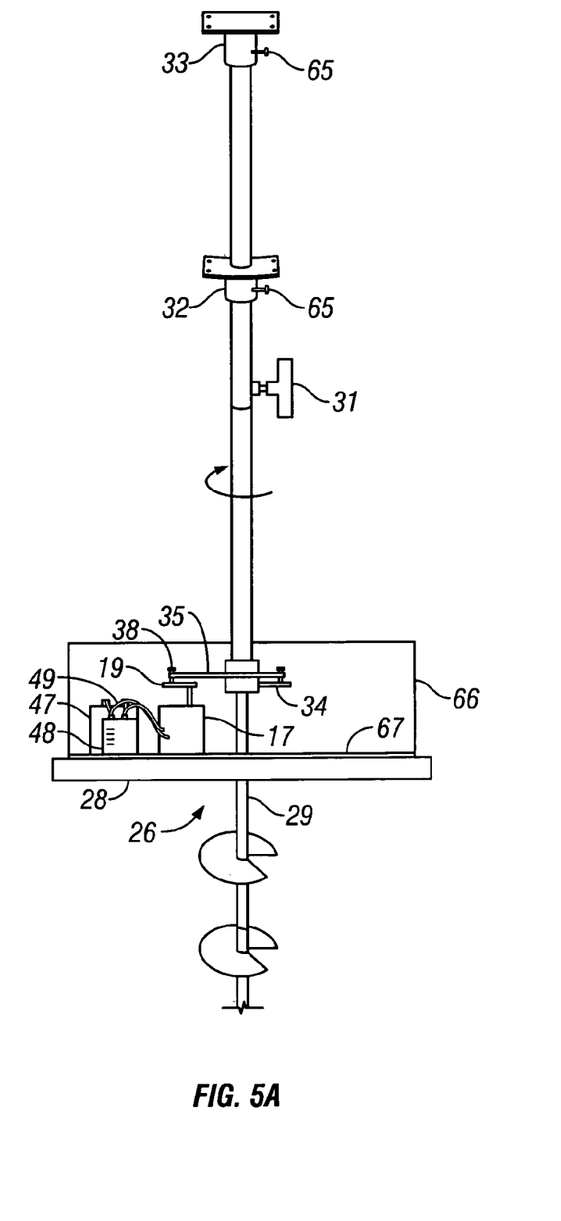
FIG. 5A is a side view depicting another embodiment of the support member.
Figure 6:
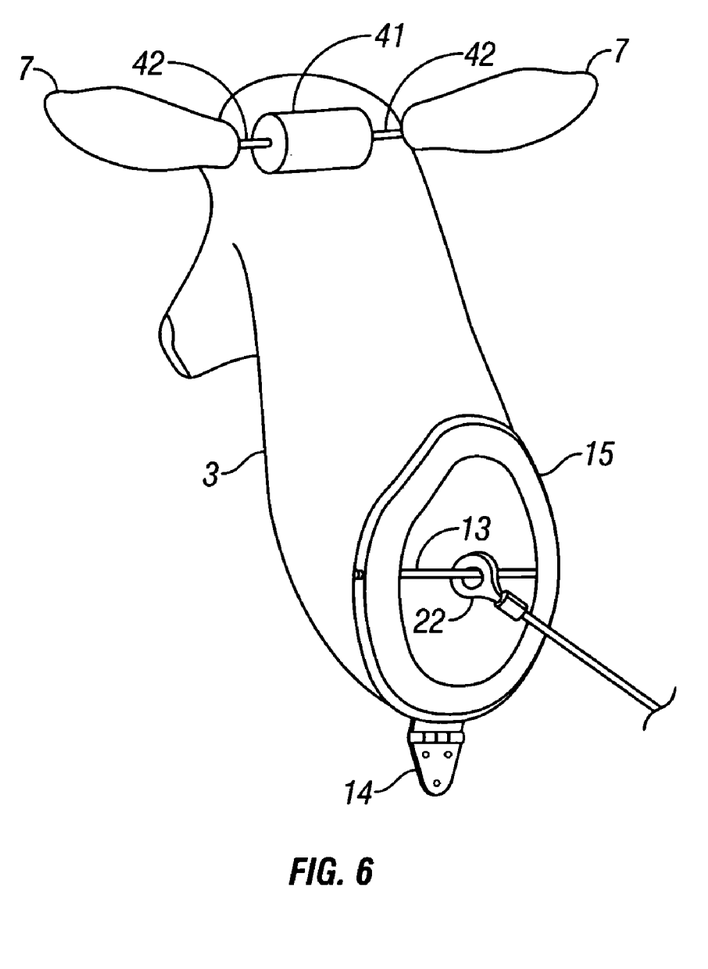
FIG. 6 is a perspective view of an alternative embodiment of the hinged connection between the forward portion and the rear portion.

Referring to FIGS. 1–11, decoy body 2 is shown as bifurcated into forward portion 3 and rear portion 4. Forward portion 3 may comprise the head and neck of a game animal (shown in FIGS. 1–9 as a deer) and may include facial features such as eyes 5, nose 6, ears 7, and optionally antlers 8, which may be removable to suit particular hunting needs. Rear portion 4 may comprise the torso region of a deer, including legs 9 and tail 10. Forward portion 3 and rear portion 4 further comprise forward interface 15 and rear interface 16, which define the respective adjoining surfaces along the aforementioned bifurcation. As shown in FIGS. 2 and 6, forward interface 15 may include a projection that extends from forward portion 3 towards rear portion 4, which projection is of a slightly smaller diameter than the neck portion of forward portion 3. This projection is designed to facilitate smooth movement of forward portion 3 with respect to rear portion 4.

Decoy body 2 may be constructed from a textured plastic, fiberglass, or other materials known to those skilled in the art sufficient to create a lifelike and sturdy animal decoy. As shown in the attached drawings, decoy body 2 may be hollow or otherwise capable of housing the various equipment needed to impart movement to decoy 1. However, decoy body 2 may also be flat or substantially flat, with the necessary equipment needed to impart movement being located on the outside of decoy body 2.

Figure 3:
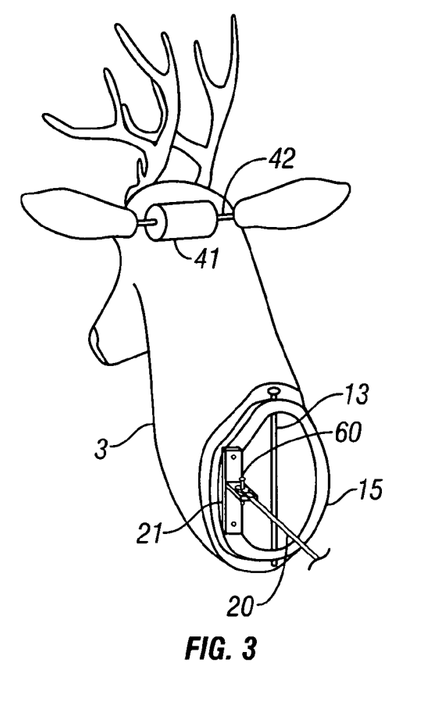
FIG. 3 is a perspective view of one embodiment of the hinged connection between the forward portion and the rear portion.

An embodiment of decoy 1 involving movement of forward portion 3 about rear portion 4 will now be described. In the embodiment shown in FIGS. 2 and 3, forward portion 3 is connected to rear portion 4 via hinged connection 11 in a manner to allow lateral, or side to side movement of forward portion 3 with respect to rear portion 4. Specifically, hinged connection 11 comprises brackets 12 and transverse rod 13. In FIGS. 2 and 3, brackets 12 are mounted in a vertical direction across rear interface 16 and receive transverse rod 13, which is secured to forward interface 15 in the vertical direction.

Alternative embodiments of hinged connection 11 are also possible. For example, brackets 12 may be secured to forward interface 15 in a vertical direction and transverse rod 13 mounted to rear interface 16 in the vertical direction. As shown in FIG. 6, hinged connection 11 may also comprise flap hinge 14 mounted to the lower ends of forward interface 15 and rear interface 16 to allow movement of forward portion 3 in the vertical direction. Flap hinge 14 could alternatively be mounted to one of the respective horizontal sides of forward interface 15 and rear interface 16, so as to allow movement of forward portion 3 about one side of rear portion 4. Hinged connection 11 may also be formed from male and female projections extending from the forward portion 3 and rear portion 4, which projections are molded from the same material as decoy body 2 so as to form an integrally molded hinge. Hinged connection 11 may also comprise a sturdy, yet flexible material joining forward portion 3 to rear portion 4. In fact, decoy body 2 may be fashioned entirely from such flexible material, making bifurcation of forward portion 3 from rear portion 4 unnecessary, so long as forward portion 3 may be moved in relation to rear portion 4.

Regardless of the chosen construction, hinged connection 11 may be covered with neck cover 25 as shown in FIG. 1 in order to conceal the mechanics of hinged connection 11 and to muffle any sounds associated with the movement of forward portion 3 about rear portion 4. Neck cover 25 may be fashioned from canvas material or any other flexible material known to those of skill in the art. Additionally, neck cover 25 may be secured to both forward portion 3 and rear portion 4 using a hook and loop fastener such as VELCRO®, snaps, buttons, rivets, stitching, or other means known to those in the art.

If neck cover 25 is not desired, rear interface 16 of rear portion 4 may be sufficiently flared and extended in the direction of forward portion 3 so as to completely engulf forward interface 15 and hinged connection 11, while still permitting forward portion 3 to move with respect to rear portion 4. In this manner, rear interface 16 would conceal hinged connection 11 and further enhance the attractive power of decoy 1. Alternatively, forward interface 15 of forward portion 4 could be sufficiently flared and extended towards rear portion 4, so as to overlap rear interface 15 and hinged connection 11. One of ordinary skill in the art will also appreciate that hinged connection 11 could be located at a position on forward interface 15 or rear interface 16 so as to allow diagonal movement of forward portion 3 with respect to rear portion 4.

Figure 10:
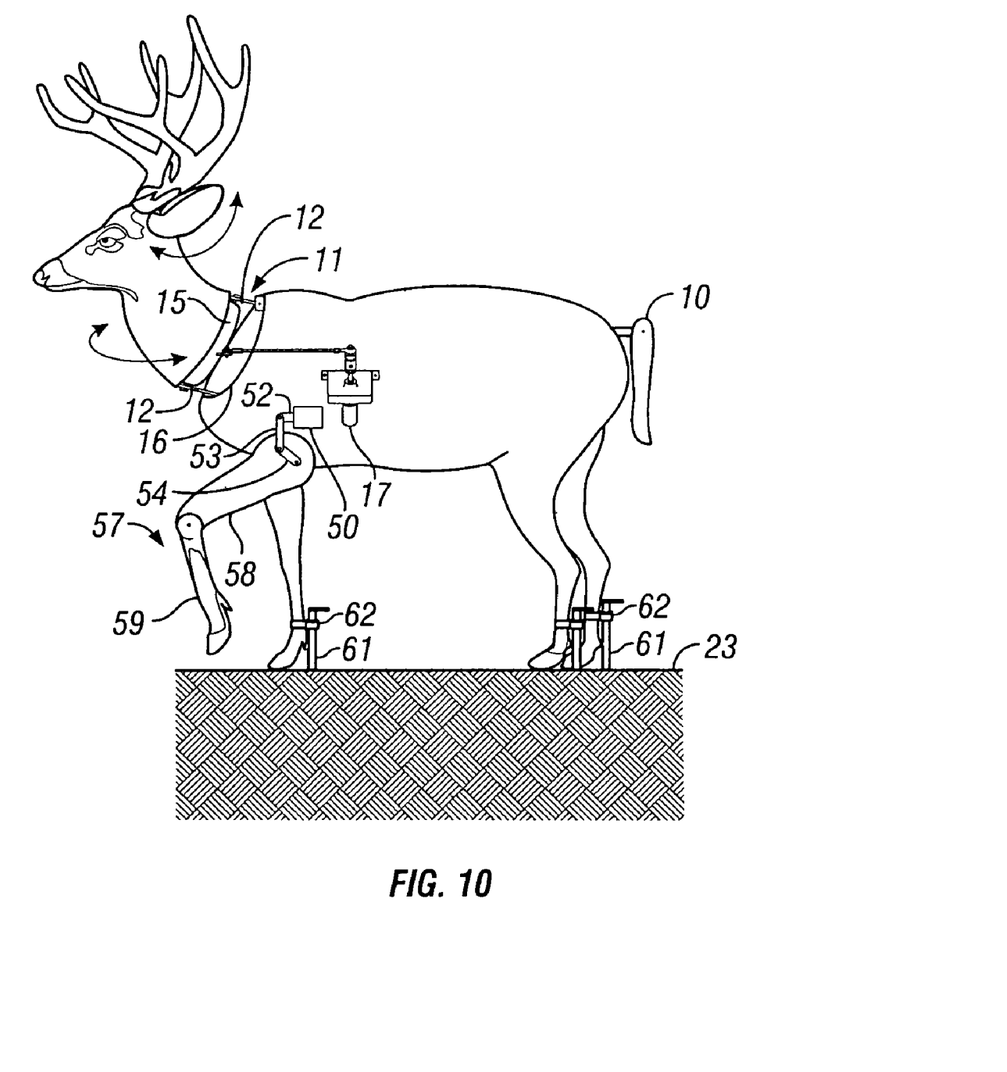
FIG. 10 is another side view of an embodiment of the decoy depicting the details of the forward portion interface, the rear portion interface, the decoy legs, and the motors responsible for imparting movement to the respective body parts.
Figure 11:
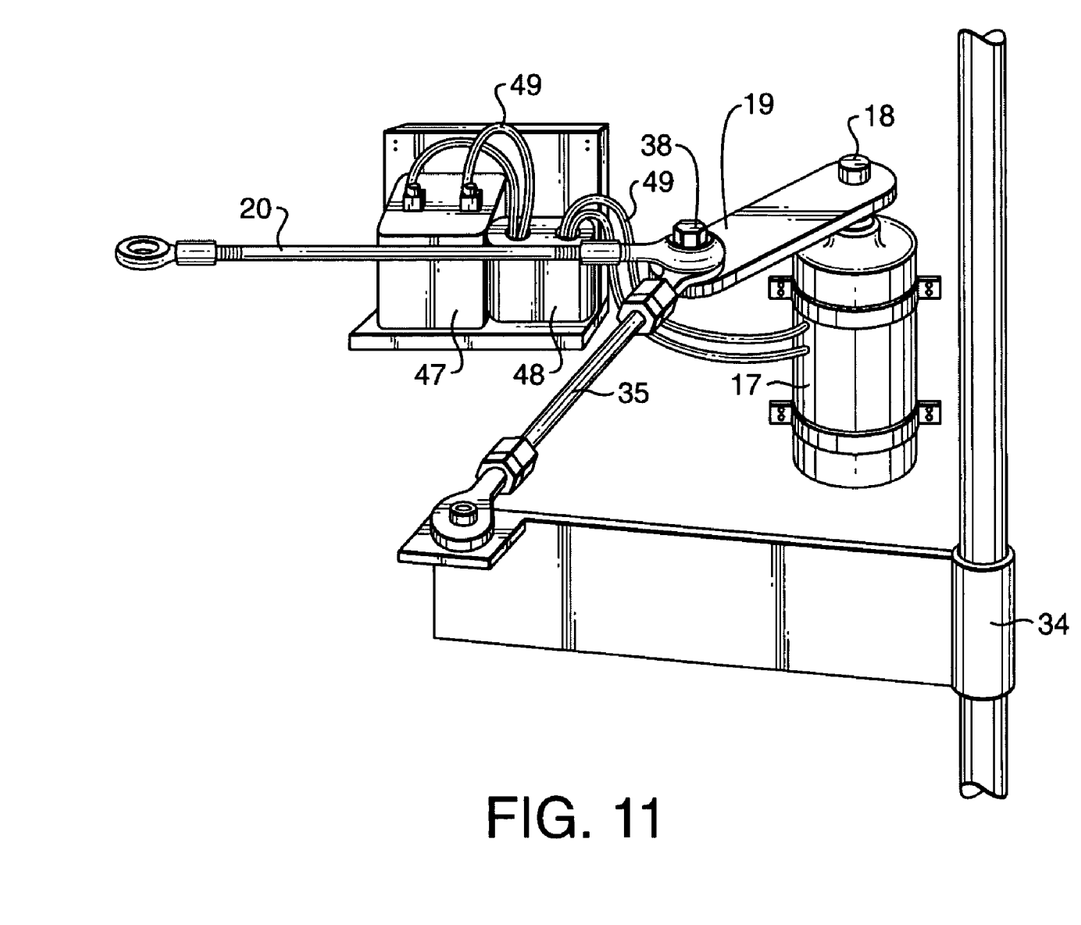
FIG. 11 is a perspective view of the decoy depicting an alternate arrangement of the motor attached to the inside wall of the decoy body for imparting motion to the forward and rear portions of the decoy.

In one embodiment, movement of forward portion 3 with respect to rear portion 4 is accomplished using central motor 17, which may be a gear motor that is rigidly secured to the inside wall of rear portion 4 as shown in FIG. 10. The attachment of central motor 17 to the inside wall of rear portion 4 may be accomplished using brackets, bolts, screws, or other means known to those skilled in the art. Central motor 17 may comprise central motor shaft 18 and central rotary arm 19, which is capable of being rotated about central motor shaft 18 three hundred and sixty (360) degrees. Connected to central rotary arm 19 is fore extension rod 20, which is pivotally attached using pivot pin 38 to central rotary arm 19 at its proximal end. The distal end of fore extension rod 20 is pivotally attached to anchor bracket 21, which in turn is rigidly attached to one side of forward interface 15 as shown in FIG. 3. As shown in FIG. 3, fore extension rod 20 is pivotally coupled to anchor bracket 21 using removable pin 60. Alternatively, the distal end of fore extension rod 20 may be fitted with eyelet 22, which is connected to transverse rod 13 mounted horizontally to forward portion 3 as shown in FIG. 6.

From the description of the above embodiment, the movement of forward portion 3 with respect to rear portion 4 can be readily understood. Central motor 17 drives central motor shaft 18 and in turn central rotary arm 19 in a circular motion, causing fore extension rod 20 to move alternately forward and backward in response to the pushing and pulling motions of central rotary arm 19. The oscillations of fore extension rod 20 are reciprocated by forward portion 3 due to the attachment of anchor bracket 21 to both fore extension rod 20 and to forward portion 3, which relationship causes forward portion 3 to pivot about transverse rod 13 in the horizontal direction. In the embodiment in which fore extension rod 20 is attached to transverse rod 13 mounted to forward portion 3 and flap hinge 14 is used, the oscillation of fore extension rod 20 causes forward portion 3 to rotate about flap hinge 14, thus causing movement of forward portion 3 in the vertical or horizontal directions, depending upon the location of flap hinge 14 on forward interface 15 and rear interface 16.

As shown in FIGS. 4 and 10, decoy body 2 may be rigidly anchored directly to ground surface 23 using stakes 61 driven through one or more bosses 62 attached to one or more or legs 9. Stakes 61 may contain a ninety (90) degree bend to facilitate driving of stakes 61 into ground surface 23.

If desired, movement of decoy body 2 with respect to ground surface 23 may be accomplished using another embodiment of decoy 1. Referring to FIGS. 1, 2, and 5, support member 24 is rigidly secured to ground surface 23 and rotatably secured to decoy body 2. In the embodiment shown, support member 24 comprises penetrating member 26 and static member 27.

Penetrating member 26 may be separated from support member 24 and is adapted to be driven into ground surface 23. In the embodiment shown, penetrating member 26 is a soil auger, which is designed to penetrate ground surface 23 using a screwing motion. To facilitate the screwing motion, penetrating member 26 may be equipped with driving means 28, which is shown in FIG. 5 as a horizontal bar welded to the central axis of penetrating member 26. Alternatively, penetrating member 26 may be a single stake, a plurality of stakes, or any other means for penetrating and rigidly adhering to ground surface 23.

Static member 27 is shown in FIG. 5 as a vertical rod with a circular cross section. However, static member 27 may have other cross sections, including but not limited to cross sections that are square, rectangular, triangular, or angled (e.g., such as a piece of angle iron). Preferably, static member 27 may be divided into two or more sections for ease of transport to and from the desired hunting location. In one embodiment, the various sections of static member 27 may be assembled by virtue of male inserts 30, each of which fit inside the female portion of static member 27 and are held in place by tightening knob screws 31. Knob screws 31 may also be substituted for thumb screws, set screws, or the like. The bottom portion of static member 27 may also attach to penetrating member 26 via knob screws 31 or similar means. Alternatively, the two sections of static member 27 may be telescoping and thus extendable or retractable to adjust the height of decoy 1 above ground surface 23 as necessary.

Support member 24 is rotatably attached to decoy body 2 near the upper end of static member 27, which penetrates the underbelly of rear portion 4 through sleeve 32. Although decoy body 2 could be rotatably mounted using the connection of static member 27 to sleeve 32, static member 27 may extend upward through rear portion 4 to the upper inside surface of rear portion 4, where the uppermost end of static member 27 is received by bushing 33. Bushing 33 is rigidly fixed to the top inside wall of rear portion 4, but allows rear portion 4 to rotate on top of static member 27 with a three hundred and sixty (360) degree range of motion.

Movement of rear portion 4 with respect to ground surface 23 may be accomplished by attaching central motor 17, which may be gear motor, to static member 27 using coupling member 34. The proximal end of aft extension rod 35 attaches to central rotary arm 19, which is rotated about central motor shaft 18. The distal end of aft extension rod 35 is pivotably secured to wall bracket 36, which is rigidly secured to the inside wall of rear portion 4. In this manner, the circular movement of central rotary arm 19 causes aft extension rod 35 to alternately push and pull wall bracket 36 and consequently rear portion 4, which rotates back and forth about static member 27 in a manner that reciprocates the motions of aft extension rod 35. Alternatively, by employing the same components, but in a reverse relationship, central motor 17 could be mounted to the inside wall of rear portion 4 and adapted to drive central rotary arm 19 attached to aft extension rod 35, which is in turn attached to coupling sleeve 34. In this manner, oscillatory movement of aft extension rod 35 operates to rotate rear portion 4 with respect to ground surface 23.

Using the descriptions set forth above, it is possible to produce at least two separate decoys 1, with one capable of moving forward portion 3 with respect to rear portion 4 and the other capable of moving rear portion 4 with respect to ground surface 23. However, it is also possible to provide simultaneous movement of both the forward portion 3 and rear portion 4 in a single decoy 1. Both movements could be provided using only central motor 17 attached to static member 27 using coupling member 34 with the proximal ends of fore extension rod 20 and aft extension rod 35 attached to central rotary arm 19. In order to allow for three hundred and sixty (360) degrees of movement of central rotary arm 19 about central motor shaft 18, the proximal ends of fore extension rod 20 and aft extension rod 35 are connected to the same pivot pin 38, one on top of another and at the same location on central rotary arm 19.

Figure 8:
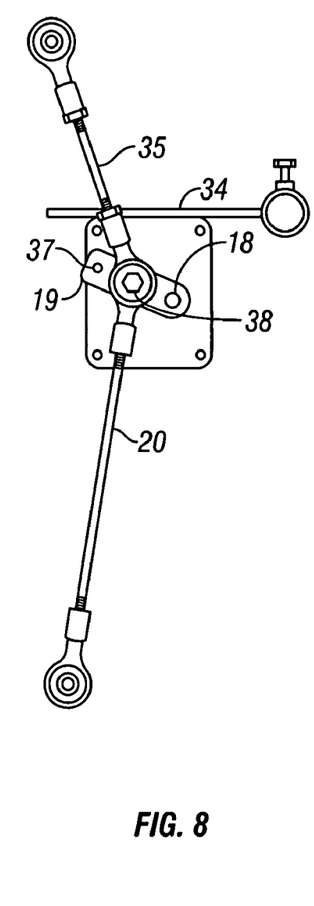
FIG. 8 is a plan view of one embodiment of the motor and extension rods responsible for imparting motion to the forward portion and rear portion.

The range of movement imparted to both forward portion 3 with respect to rear portion 4 and rear portion 4 with respect to ground surface 23 may be adjusted to suit the needs of the hunter. Referring to FIG. 8, central rotary arm 19 may have at least one additional pivot aperture 37 to which fore extension rod 20 and aft extension rod 35 may be attached to either increase or decrease the moment arm of central rotary arm 19 and thereby increase of decrease the range of movement of both fore extension rod 20 and aft extension rod 35. Additionally, a second rotary arm (not shown) could be attached to central motor shaft 18 and either fore extension rod 20 or aft extension rod 35 could be attached thereto, thereby modifying the respective movements of decoy 1.

Figure 7:
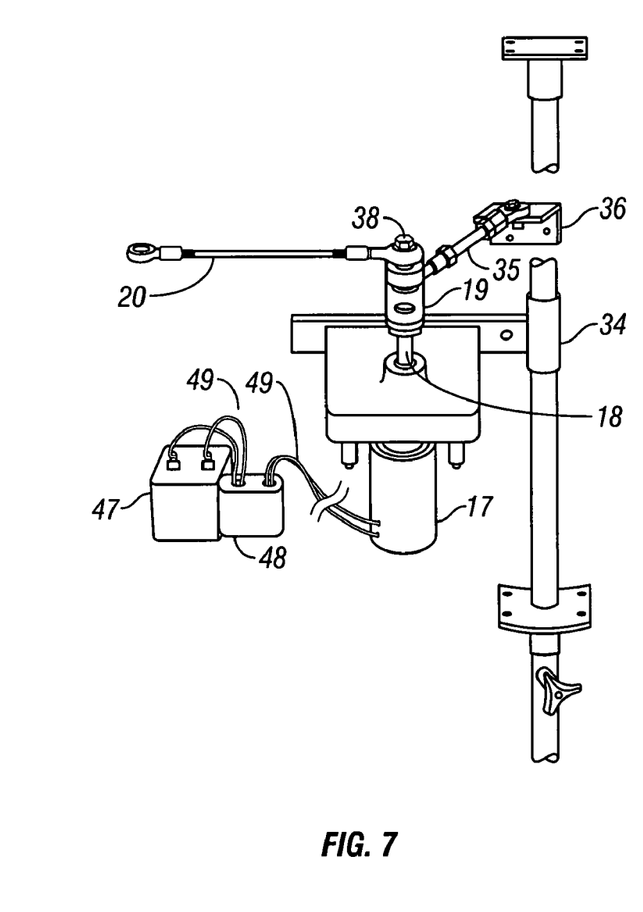
FIG. 7 is a perspective view of an embodiment of the motor, extension rods, powering means, and remote control receiver responsible for imparting motion to the forward portion and rear portions of the decoy.

The movement of forward portion 3 with respect to rear portion 4 and the movement of rear portion 4 with respect to ground surface 23 can also be modified by increasing or decreasing the respective lengths of fore extension rod 20 and aft extension rod 35. Referring to FIGS. 7 and 8, fore extension rod 20 and aft extension rod 35 may be threaded along their lengths, thus allowing the lengths of each to be extended from or retracted into eyelets 22. By changing the lengths of fore extension rod 20 and aft extension rod 35, the amount and character of the movements of decoy 1 can be adjusted as required to suit the needs of a particular hunt or hunter.

Figure 9:
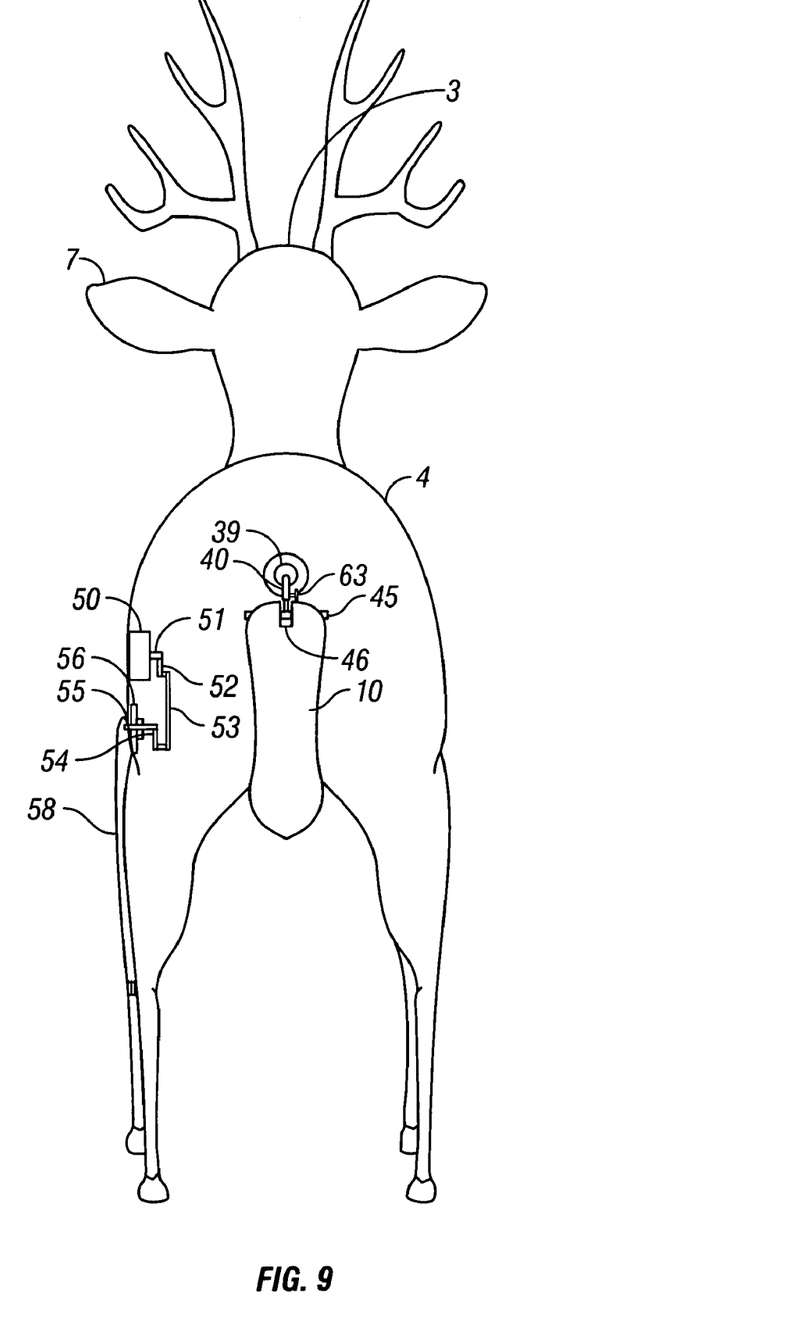
FIG. 9 is a side view of an embodiment of the decoy depicting the hinged leg and tail connections that allow the decoy to simulate both tail and pawing movement.

Referring to FIGS. 4 and 9, movement of tail 10 with respect to rear portion 4 is accomplished using tail motor 39, which may be a direct drive motor with a shaft end protruding from one end of the motor housing (commonly referred to as a "single shaft direct drive motor"). Alternatively, tail motor 39 may be a gear motor. Tail motor 39 drives tail motor shaft 40, which is attached to the proximal end of tail 10 at an angle that is substantially perpendicular to tail motor shaft 40. If so desired, tail motor shaft 40 may be divided into two sections, with one section connecting to tail motor 39 and the other connected to tail 10. Where the two sections meet, a release mechanism 63, such as a set screw, thumb screw, or the like may be added to allow the tail section to be removed during transport.

When activated, tail motor 39 may rotate tail 10 about an angle of three hundred and sixty (360) degrees. In one embodiment, however, motor 39 is activated for brief periods of time, such that tail 10 flicks abruptly to one side or the other and not more than 90 degrees in either direction. Once tail motor 39 is deactivated, the upward movement of tail 10 ceases and the weight of tail 10 causes tail 10 to swing back and forth from one side of rear portion 4 to the other, until tail 10 gradually returns to its original hanging vertical position. Additionally, tail 10 may be weighted at the distal end to ensure its return to the downward hanging position shown in FIG. 4 and to amplify the amount of swinging from side to side.

The angle of rotation of tail 10 may be modified by varying the angle at which tail 10 engages tail motor shaft 40. In one embodiment, tail 10 may be fitted with axial pin 45, which pierces the proximal end of tail 10 at an angle perpendicular to the longitudinal axis of tail 10. Axial pin 45 is rigidly connected near its mid-section to tail motor shaft 40 by virtue of notch 46 as shown in FIG. 9. In this manner, tail 10 can be rotated about axial pin 45, thus varying the angle of tail 10 with respect to tail motor shaft 40 as needed to suit hunting conditions. The more this angle is decreased, the less force that is needed to rotate tail 10 about motor shaft 40.

In the embodiment shown in FIG. 4A, tail 10 may be flipped directly from the downward position to the upright position by orienting tail motor 39 and tail motor shaft 40 perpendicular to tail 10, providing second rotary arm 43 attached to cable 44, attaching the proximal end of tail 10 to axial pin 45, attaching the terminal ends of axial pin 45 to journals 68, and flipping tail 10 along the longitudinal plane of decoy body 2. As can be seen in FIG. 4A, the proximal end of tail 10 is secured to rear portion 4 by axial pin 45, about which tail 10 may be rotated from the downward position to the upright position.

In this alternative embodiment, tail motor 39 may be a gear motor of the same type as central motor 17 or may be a direct drive motor. Tail motor 39 contains second rotary arm 43 attached to tail motor shaft 40. At the distal end of second rotary arm 43 is attached one end of cable 44, which may be flexible. The opposite end of cable 44 is attached to and wound about axial pin 45, which is rotatably mounted to rear portion 4 using journals 68. Rotation of second rotary arm 43 away from tail 10 places tension on cable 44, thus causing cable 44 to unwind and pull tail 10 into the upright position. In order to facilitate the movement of tail 10 about axial pin 45 and the winding of cable 44 about axial pin 45, tail 10 may contain notch 46. Once upward motion of tail 10 has ceased, tail 10 will fall back into the downward position under the influence of gravity, thus causing cable 44 to rewind about axial pin 45.

If desired, the aforementioned structure can be reconfigured to cause tail 10 to move from side to side, rather than up and down. This movement is accomplished by orienting axial pin 45 in the vertical direction (secured in place by journals 68 positioned one above the other) and tail 10 in the horizontal direction, such that movement of second rotary arm 43 pulls and unwinds cable 44 from axial pin 45, thereby causing tail 10 to flip from one side of rear portion 4 to the other. In order to ensure the return of tail 10 to the original side position and the rewinding of cable 44 about axial pin 45, a spring (not shown) or similar means may be attached to axial pin 45 or near the proximal end of tail 10.

Referring to FIGS. 2, 3, and 6, the movement of ears 7 with respect to forward portion 3 is accomplished using ear motor 41, which drives ear motor shafts 42. As shown in FIGS. 3 and 6, ear motor 41 may be a direct drive motor with a shaft end protruding from each end of the motor housing (commonly referred to as a "dual shaft direct drive motor") and rotatable about a common axis of rotation. Alternatively, ear motor 41 may be a gear motor designed to maintain ear motor shafts 42 in a static position once ear motor 41 is deactivated.

If ear motor 41 is a direct drive motor, ear motor shafts 42 may be two separate shafts extending from opposite ends of ear motor 41, or ear motor shaft 42 may be a single shaft running all the way through the motor housing. As can be understood by reference to FIGS. 2 and 3, ears 7 may be attached directly to ear motor shafts 42 for common rotation about ear motor shafts 42. Although ears 7 may be rotated three hundred and sixty degrees about ear motor shafts 42, ear motor 41 may be operated for brief periods of time and ears 7 may be weighted at the bottom lobes to allow ears 7 to return to the forward facing position once ear motor 41 has been deactivated.

If ear motor 41 is a gear motor, ear motor shafts 42 will hold a static position once ear motor 41 has been deactivated. In order to return ears 7 to the original position, movement of ear motor shafts 42 can be reversed.

Referring to FIGS. 2, 9, and 10, decoy 1 may also simulate a pawing movement of one or more of the forelimbs. This pawing movement is accomplished using leg motor 50 and one or more hinged limbs 57, each of which are divided into first leg portion 58 and second leg portion 59, with first leg portion 58 and second leg portion 59 being hingedly connected. Leg motor 50, which may be a gear motor or a direct drive motor, is attached using ordinary means to the lower inside surface or the inner sidewall of rear portion 4. Leg motor 50 drives leg motor shaft 51, to which is attached leg rotary arm 52. The proximal end of link rod 53 is pivotally attached near the distal end of leg rotary arm 52. The distal end of link rod 53 is further pivotally attached to the distal end of lever 54. The proximal end of lever 54 is rigidly attached to the proximal end of transfer shaft 55, which extends from the proximal end of lever 54 through leg bushing 56 and the side wall of rear portion 4. The distal end of transfer shaft 56 is rigidly attached to the proximal end of first leg portion 58.

From the foregoing description, the pawing movement of decoy 1 may be realized. Leg motor 50 drives leg motor shaft 51 and consequently rotates leg rotary arm 52. The movements of leg rotary arm 52 about leg motor shaft 51 causes link rod 53 to vertically oscillate, which oscillations are reciprocated by lever 54. As lever 54 is moved by link rod 53, transfer shaft 55 rotates inside leg bushing 56, thus causing first leg portion 58 to partially rotate in reciprocation to the rotations of transfer shaft 55. The effect of this rotation is that leg portion 58, which may correspond to the thigh of the selected animal, raises and lowers second leg portion 59, which may correspond to the shin and calf of the selected animal. Because first leg portion 58 is hingedly connected to second leg portion 59, hinged limb 57 creates the illusion of an animal raising its foreleg (or rear leg if desired) while at the same time bending same, then lowering and straightening its foreleg to paw at the earth, which motion is common amongst certain game animals.

The activation of central motor 17, tail motor 39, ear motor 41, and leg motor 50 is accomplished by powering means 47, which may be one or more six volt batteries, one or more twelve volt batteries, or any other means known to those in the art for providing electric power to the respective motors. Each of central motor 17, tail motor 39, ear motor 41, and leg motor 50 may be activated by separate powering means 47 or all may be activated by a single powering means 47. Additionally, powering means 47 may be contained within decoy body 2 and activated remotely or located outside decoy body 2 within reach of the hunter.

In the embodiment shown in FIG. 7, powering means 47 is a six volt battery located within decoy body 2 and potentially within rear portion 4, where the battery is secured to the lower inside wall of rear portion 4 via brackets or other means commonly known to those skilled in the art. Powering means 47 is appropriately coupled to remote control receiver 48 by wires 49, and remote control receiver 48 may in turn be connected to one or more of central motor 17, tail motor 39, ear motor 41, and leg motor 50 also by wires 49. Alternatively, each of central motor 17, tail motor 39, ear motor 41, and leg motor 50 may be activated by a separate remote control receiver 48.

In the embodiments described above, remote control receiver 48 responds to on/off signals from a remote control transmitter (not shown). Remote control receiver 48 may also be a multi-cycle remote control receiver, which enables the user to preselect or program the length of time for which the attached motor is turned on and off, as well as the sequence in which each attached motor is turned on and off. Alternatively, a modulator may be used instead of or in conjunction with remote control receiver 48, allowing the user to preselect or preprogram the time periods for which the attached motor is turned on and off. As will be commonly understood by those skilled in the art, a modulator allows the user to vary the periods of activation of one or more motors without the need for remote control activation. As will be further explained, however, a modulator can be combined with a remote control for added movement options.

If a multi-cycle remote control or modulator is used, the hunter may preselect the periods of activation of one or more of central motor 17, tail motor 39, ear motor 41, and leg motor 50, depending on the motor(s) to which the multi-cycle remote control receiver or modulator is attached. For example, the respective motors may operate according to one or more of the following frequencies: 6 seconds on/16 seconds off, 16 seconds on/6 seconds off, 10 seconds on/20 seconds off, or 2 seconds on/20 seconds off. The foregoing frequencies of operation are provided for illustrative purposes only. Other periods of activation can be programmed using the multi-cycle remote control receiver or modulator as desired by the user.

In one embodiment, a single remote control receiver 48 or modulator is connected to each of central motor 17, tail motor 39, ear motor 41, and leg motor 50, thus causing the following movements of decoy 1 to commence simultaneously and cease simultaneously: (1) movement of forward portion 3 with respect to rear portion 4, (2) movement of rear portion 4 with respect to ground surface 23, (3) movement of tail 10 with respect to rear portion 4, (4) movement of ears 7 with respect to forward portion 3, and (5) movement of one or more of legs 9 with respect to rear portion 4. For ease of reference, these aforementioned movements may be alternatively referred to throughout this application as movements (1), (2), (3), (4), and (5). If the user so desires, one or more of movements (1)–(5) may be disabled as necessary to suit hunting needs.

Additionally, the same single multi-cycle remote control receiver 48 may be connected to each of central motor 17, tail motor 39, ear motor 41, and leg motor 50 in a manner to allow each of the above described movements to commence sequentially, rather than simultaneously. For example, remote control receiver 48 may be programmed to cause decoy 1 to first move ears 7 with respect to forward portion 3 for a period of 2 seconds, followed by movement of tail 10 with respect to rear portion 4 for a period of 2 seconds, followed by movement of rear portion 4 with respect to ground surface 23 and movement of forward portion 3 with respect to rear portion 4 (assuming the embodiment is used wherein central motor 17 provides both movements) for a period of 5 seconds, and finally followed by movement of one or more legs 9 with respect to rear portion 4 for a period of 4 seconds. The foregoing sequence of movements is for illustrative purposes only. Various other sequences and time delays are contemplated by the instant invention depending upon the particular remote control receiver 48, number of motors, and motor configurations selected by the hunter.

In another embodiment, the hunter may prefer to install multiple multi-cycle remote controls, multiple modulators, or a combination thereof, for the purpose of creating independent random movements of ears 7, tail 10, forward portion 3, rear portion 4, and one or more of legs 9. For example, the hunter could employ a multi-cycle remote control receiver to actuate central motor 17, while employing modulators to actuate tail motor 39, ear motor 41, and leg motor 50. In this manner, movements (1) and (2) above could be commenced, ceased and altered in terms of timing and sequence of operation from a remote location, while movements (3), (4), and (5) would commence and cease in accordance with preprogrammed instructions. This combination of multi-cycle remote controls and modulators may further enhance the similarities and attractiveness of decoy 1 to live game animals. Other combinations of ordinary remote control receivers, multi-cycle remote control receivers, and modulators as necessary to tailor the movements of decoy 1 to suit hunting needs are also contemplated by the instant invention.

If so desired, decoy 1 may be designed with one or more motors located outside of decoy body 2, so as to provide for ease of maintenance and to preserve the motors in the event that decoy 1 is damaged from gunfire. By way of example, FIG. 5A depicts an embodiment of the present invention wherein central motor 17, which receives power from powering means 47 as dictated by remote control receiver 48 or a modulator, is mounted to mounting plate 67, which is affixed atop penetrating member 26 near driving means 28. Consistent with previous embodiments, central motor 17 drives central motor shaft 18 and in turn rotates central rotary arm 19. Pivotally attached to central rotary arm 19 via pivot pin 38 is aft extension rod 35, the opposite end of which is attached to coupling member 34, which contains a lever arm and a sleeve portion, which sleeve portion is rigidly attached to static member 27 near the point of attachment with penetrating member 26. In this embodiment, static member 27 is rigidly attached to the upper inside surface of rear portion 4 by means of bushing 33. Static member 27 is held fast to bushing 33 and/or sleeve 32 using thumb screws 65 or other means known in the art. If decoy body 2 is flat or substantially flat, then static member 27 may be attached to the outside surface of decoy body using brackets, bolts, or other ordinary means, without the need for bushing 33 or sleeve 32. If static member is manufactured in two or more sections, knob screws 31 may be used to secure the multiple sections together. Static member 27 (with coupling member 34 attached) is pivotally secured to penetrating member 26. As shown in FIG. 5A, static member 27 with coupling member 34 may be pivotally secured atop male insert 30.

From the foregoing description, the alternative means of moving rear portion 4 with respect to ground surface 23 can be understood. Central motor 17 rotates central rotary arm 19 and causes aft extension rod 35 to oscillate, which oscillations are reciprocated by the lever arm of coupling member 34. Coupling member 34 induces static member 27 to rotate about penetrating member 26, thereby causing rear portion 4 to correspondingly rotate with respect to ground surface 23 about penetrating member 26.

In order to protect central motor 17 from the elements and to reduce the amount of noise associated with its operation, housing 66 may be fitted over central motor 17, powering means 47, remote control receiver 48, aft extension rod 35, and/or coupling member 34 and secured to mounting plate 67. Housing 66 may be manufactured in two or more sections in order to fit around static member 27 without interfering with the ability of static member 27 to rotate about penetrating member 26.

In addition to the features described above, decoy 1 may be equipped with a number of other features designed to enhance the attractive power of decoy 1 to a selected game animal. For example, antlers 8, which may be fashioned from wood, plastic, styrofoam, or any other suitable material, are attached to forward portion 3 using male and female adapters, staples, screws, clips, snaps, hook and loop fasteners, or other means apparent to those skilled in the art. Because antlers 8 constitute a structure separate from forward portion 3, antlers 8 may be detached from forward portion 3 in order to change the apparent sex of decoy 1 from male to female. Additionally, decoy 1 may be manufactured with genitalia (not shown) that is attached to rear portion 4 using means known to those of skill in the art, including without limitation, hook and loop fasteners, snaps, screws, staples, and male/female adapters. In this embodiment, the decoy genitalia may be removed in order to change the sex of decoy 1 from male to female or vice versa.

The attractiveness of decoy 1 to wild game may also be enhanced by combining the above described features with the use of chemical attractants, including, but not limited to, deer urine. In one embodiment, scent disperser 64 may be attached to tail 10 in order to diffuse scent into the area immediately surrounding decoy 1. Scent disperser 64 may take any number of forms known to those skilled in the art, including, but not limited to a scent wick or a piece of absorbent material designed to absorb and hold a liquid or gelled chemical attractant and which is attached via an adapter either directly to tail 10, tail motor shaft 40, or directly to rear portion 4 near tail 10. In this manner, chemical attractant may be exposed to the air or wind or released into the surrounding area upon movement of tail 10.

There are, of course, other alternate embodiments that are obvious from the foregoing descriptions of the invention, which are intended to be included within the scope of the invention, as defined by the following claims.

What is claimed is:

1. An improved motorized game decoy, said decoy comprising:
   (a) a decoy body, said decoy body further comprising
      (i) a rear portion; and
      (ii) at least one leg attached to said rear portion, said at least one leg being hinged at one or more joints along said at least one leg and further comprising a free end and an attached end; and
   (b) a leg motor, said leg motor moving said at least one leg in a pawing motion by bending said at least one leg along said one or more joints, wherein said free end is moved with respect to a ground surface.

2. The decoy described in claim 1, wherein said decoy body simulates an ungulate game animal.

3. The decoy described in claim 1, wherein said decoy body simulates an animal commonly found in the habitat of an ungulate game animal.

4. The decoy described in claim 1, wherein said at least one leg is divided into a first leg portion with said attached end and a second leg portion with said free end, wherein said decoy further comprises:
   (a) a leg motor shaft attached to said leg motor;
   (b) a fourth rotary arm having a distal end and a proximal end, said proximal end being attached to said leg motor shaft; and
   (c) a link rod having a rotary end and an anchor end, said rotary end attached to said distal end of said fourth rotary arm;
   (d) a lever having a first end and a second end, said first end of said lever attached to said anchor end of said link rod; and
   (e) a transfer shaft having a distal end and a proximal end, said proximal end of said transfer shaft attached to said second end of said lever and said distal end of said transfer shaft attached to said first portion;
   wherein said leg motor drives said leg motor shaft and rotates said fourth rotary arm, thereby oscillating said link rod, actuating said lever, and rotating said transfer shaft, causing said first leg portion and said second leg portion to move in said pawing motion.

5. The decoy as described in claim 1, said decoy further comprising a remote control receiver and a remote control transmitter, said remote control receiver adapted to receive signals from said remote control transmitter from a remote distance, said remote control receiver activating said leg motor in response to said signals from said remote control transmitter.

6. The decoy as described in claim 1, said decoy further comprising a multi-cycle remote control receiver and a multi-cycle remote control transmitter, said multi-cycle remote control receiver adapted to receive signals from said multi-cycle remote control transmitter from a remote distance, said multi-cycle remote control receiver activating said leg motor in response to signals from said multi-cycle remote control transmitter, said multi-cycle remote control receiver and said multi-cycle remote control transmitter being further adapted to operate said leg motor and raise and lower said at least one leg in said pawing motion with intermittent frequency.

7. The decoy as described in claim 1, said decoy further comprising a modulator, said modulator being adapted to operate said leg motor and raise and lower said at least one leg in said pawing motion with intermittent frequency.

8. The decoy described in claim 1, wherein said decoy further comprises
   (a) a tail; and
   (b) a tail motor, said tail motor adapted to move said tail with respect to said rear portion.

9. The decoy described in claim 8, said decoy further comprising:
   (a) a tail motor shaft attached to said tail motor; and
   (b) an axial pin, said axial pin penetrating said tail and attached to said tail motor shaft to allow said tail to be rotated about said axial pin, thereby altering the angle of said tail with respect to said tail motor shaft.

10. The decoy described in claim 1, wherein said decoy further comprises detachable antlers.

11. The decoy described in claim 1, wherein said decoy further comprises a scent disperser for distributing a chemical attractant.

12. An improved motorized game decoy, said decoy comprising:
   (a) a decoy body, said decoy body further comprising
      (i) a forward portion, said forward portion simulating a head and a neck of an animal;
      (ii) a rear portion, said rear portion simulating a torso and legs of said animal; and
      (iii) a hinged connection;
      wherein said animal is selected from the group consisting of an ungulate animal, an armadillo an opossum, a fox, and a coyote; and
   (b) a central motor, said central motor adapted to provide movement of said forward portion with respect to said rear portion about said hinged connection.

13. The decoy described in claim 12, wherein said decoy body simulates an ungulate game animal.

14. The decoy described in claim 12, wherein said movement of said forward portion with respect to said rear portion is selected from the group consisting of horizontal movement, vertical movement, and diagonal movement.

15. The decoy described in claim 12, wherein said decoy further comprises:
   (i) a central motor shaft attached to said central motor;
   (ii) a central rotary arm having a distal end and a proximal end, said proximal end being attached to said central motor shaft; and
   (iii) a fore extension rod having a rotary end and an anchor end, said rotary end attached to said distal end of said central rotary arm and said anchor end attached to said forward portion;

wherein said central motor drives said central motor shaft and rotates said central rotary arm, wherein said central rotary arm causes said fore extension rod to oscillate, thereby imparting motion to said forward portion with respect to said rear portion about said hinged connection.

16. The decoy as described in claim 12, wherein said hinged connection is selected from the group consisting of a transverse rod and bracket connection, a flap hinge, a molded hinge, and a flexible material.

17. The decoy as described in claim 12, said decoy further comprising a remote control receiver and a remote control transmitter, said remote control receiver adapted to receive signals from said remote control transmitter from a remote distance, said remote control receiver activating said central motor in response to said signals from said remote control transmitter.

18. The decoy as described in claim 12, said decoy further comprising a multi-cycle remote control receiver and a multi-cycle remote control transmitter, said multi-cycle remote control receiver adapted to receive signals from said multi-cycle remote control transmitter from a remote distance, said multi-cycle remote control receiver activating said central motor in response to signals from said multi-cycle remote control transmitter, said multi-cycle remote control receiver and said multi-cycle remote control transmitter being further adapted to operate said central motor and move said forward portion with respect to said rear portion with intermittent frequency.

19. The decoy as described in claim 12, said decoy further comprising a modulator, said modulator being adapted to operate said central motor and move said forward portion with respect to said rear portion with intermittent frequency.

20. The decoy described in claim 12, wherein said decoy further comprises
 (a) a tail; and
 (b) a tail motor, said tail motor adapted to move said tail with respect to said rear portion.

21. The decoy described in claim 20, said decoy further comprising:
 (a) a tail motor shaft attached to said tail motor; and
 (a) an axial pin, said axial pin penetrating said tail and attached to said tail motor shaft to allow said tail to be rotated about said axial pin, thereby altering the angle of said tail with respect to said tail motor shaft.

22. The decoy described in claim 12, wherein said decoy further comprises detachable antlers.

23. The decoy described in claim 12, wherein said decoy further comprises a scent disperser for distributing a chemical attractant.

24. An improved motorized game decoy, said decoy comprising:
 (a) a decoy body, said decoy body further comprising
  (i) a forward portion, said forward portion simulating a head and a neck of an animal;
  (ii) a rear portion, said rear portion simulating a torso and legs of said animal;
  (iii) a hinged connection between said forward portion and said rear portion; and
  (iv) ears; and
 (b) an ear motor, wherein said ear motor moves said ears with respect to said forward portion.

25. The decoy described in claim 24, wherein said decoy body simulates an ungulate game animal.

26. The decoy described in claim 24, wherein said decoy body simulates an animal commonly found in the habitat of an ungulate game animal.

27. The decoy described in claim 24, wherein said decoy further comprises:
 (a) at least one ear motor shaft, said ears being attached to said at least one ear motor shaft; and
 (b) a weighting means;
 wherein said ear motor drives said at least one ear motor shaft and causes said ears to rotate about said at least one ear motor shaft wherein said weighting means causes said ears to return to a forward facing position once operation of said ear motor is ceased.

28. The decoy as described in claim 24, said decoy further comprising a remote control receiver and a remote control transmitter, said remote control receiver adapted to receive signals from said remote control transmitter from a remote distance, said remote control receiver activating said ear motor in response to said signals from said remote control transmitter.

29. The decoy as described in claim 24, said decoy further comprising a multi-cycle remote control receiver and a multi-cycle remote control transmitter, said multi-cycle remote control receiver adapted to receive signals from said multi-cycle remote control transmitter from a remote distance, said multi-cycle remote control receiver activating said ear motor in response to signals from said multi-cycle remote control transmitter, said multi-cycle remote control receiver and said multi-cycle remote control transmitter being further adapted to operate said ear motor and move said ears with respect to said forward portion with intermittent frequency.

30. The decoy as described in claim 24, said decoy further comprising a modulator, said modulator being adapted to operate said ear motor and move said ears with respect to said forward portion with intermittent frequency.

31. The decoy described in claim 24, wherein said decoy further comprises detachable antlers.

32. The decoy described in claim 24, wherein said decoy further comprises a scent disperser for distributing a chemical attractant.

33. An improved motorized game decoy, said decoy comprising:
 (a) a decoy body, said decoy body further comprising
  (i) a forward portion, said forward portion simulating a head and a neck of an animal; and
  (ii) a rear portion, said rear portion simulating a torso and legs of said animal;
  wherein said animal is selected from the group consisting of an ungulate animal, an armadillo, an opossum, a fox, and a coyote; and
 (b) a support member attached to said rear portion and attachable to a ground surface; and
 (c) a central motor statically attached to a portion of said decoy body or said support member, wherein said central motor moves said decoy body in its entirety with respect to said ground surface.

34. The decoy described in claim 33, wherein said decoy body simulates an ungulate game animal.

35. The decoy described in claim 33, wherein said support member is telescoping.

36. The decoy described in claim 33, wherein said support member comprises a static member and a penetrating member.

37. The decoy described in claim 36, wherein said penetrating member is selected from a group consisting of an auger, a stake, and a plurality of stakes.

38. The decoy described in claim 36, wherein said static member is divided into at least two sections.

39. The decoy described in claim 33, wherein said decoy further comprises:
   (a) a central motor shaft attached to said central motor;
   (b) a central rotary arm having a distal end and a proximal end, said proximal end being attached to said central motor shaft; and
   (c) an aft extension rod having a rotary end and an anchor end, said rotary end attached to said distal end of said central rotary arm and said anchor end attached to said rear portion;
   wherein said central motor is attached to said support member, drives said central motor shaft, and rotates said central rotary arm, wherein said central rotary arm causes said aft extension rod to oscillate, thereby imparting motion to said rear portion with respect to said support member and said ground surface so as to move the entire decoy body with respect to the ground surface.

40. The decoy as described in claim 33, wherein said decoy further comprises:
   (a) a central motor shaft attached to said central motor;
   (b) a central rotary arm having a distal end and a proximal end, said proximal end being attached to said central motor shaft; and
   (c) an aft extension rod having a rotary end and an anchor end, said rotary end attached to said distal end of said central rotary arm and said anchor end attached to said support member;
   wherein said central motor is attached to said rear portion, drives said central motor shaft and rotates said central rotary arm, thereby causing said aft extension rod to oscillate and imparting motion to said rear portion with respect to said support member and said ground surface so as to move the entire decoy body with respect to the ground surface.

41. The decoy as described in claim 33, wherein said decoy further comprises:
   (a) a central motor shaft attached to said central motor;
   (b) a central rotary arm having a distal end and a proximal end, said proximal end being attached to said central motor shaft; and
   (c) an aft extension rod having a rotary end and an anchor end, said rotary end attached to said distal end of said central rotary arm and said anchor end attached to a coupling sleeve, said coupling sleeve being attached to said support member;
   wherein said central motor drives said central motor shaft and rotates said central rotary arm, thereby causing said aft extension rod to oscillate and imparting motion to said rear portion with respect said ground surface so as to move the entire decoy body with respect to the ground surface.

42. The decoy as described in claim 33, said decoy further comprising a remote control receiver and a remote control transmitter, said remote control receiver adapted to receive signals from said remote control transmitter from a remote distance, said remote control receiver activating said central motor in response to said signals from said remote control transmitter.

43. The decoy as described in claim 33, said decoy further comprising a multi-cycle remote control receiver and a multi-cycle remote control transmitter, said multi-cycle remote control receiver adapted to receive signals from said multi-cycle remote control transmitter from a remote distance, said multi-cycle remote control receiver activating said central motor in response to signals from said multi-cycle remote control transmitter, said multi-cycle remote control receiver and said multi-cycle remote control transmitter being further adapted to operate said central motor and move said entire decoy body with respect to said ground surface with intermittent frequency.

44. The decoy as described in claim 33, said decoy further comprising a modulator, said modulator being adapted to operate said central motor and move said entire decoy body with respect to said ground surface with intermittent frequency.

45. The decoy described in claim 33, wherein said decoy further comprises
   (a) a tail; and
   (b) a tail motor, said tail motor adapted to move said tail with respect to said rear portion.

46. The decoy described in claim 45, said decoy further comprising:
   (a) a tail motor shaft attached to said tail motor; and
   (b) an axial pin, said axial pin penetrating said tail and attached to said tail motor shaft to allow said tail to be rotated about said axial pin, thereby altering the angle of said tail with respect to said tail motor shaft.

47. The decoy described in claim 33, wherein said decoy further comprises detachable antlers.

48. The decoy described in claim 33, wherein said decoy further comprises a scent disperser for distributing a chemical attractant.

49. An improved motorized game decoy, said decoy comprising:
   (a) a decoy body, said decoy body further comprising
      (i) a forward portion, said forward portion simulating a head and a neck of an animal;
      (ii) a rear portion, said rear portion simulating a torso and legs of said animal; and
      (iii) a hinged connection;
      wherein said animal is selected from the group consisting of an ungulate animal, an armadillo, an opossum a fox, and a coyote; and
   (b) a support member attached to said rear portion and attachable to a ground surface; and
   (c) a central motor, said central motor adapted to provide movement of said forward portion with respect to said rear portion about said hinged connection, said central motor being further adapted to move said rear portion with respect to said ground surface.

50. The decoy described in claim 49, wherein said decoy body simulates an ungulate game animal.

51. The decoy described in claim 49, wherein said movement of said forward portion with respect to said rear portion is selected from the group consisting of horizontal movement, vertical movement, and diagonal movement.

52. The decoy described in claim 49, wherein said support member is telescoping.

53. The decoy described in claim 49, wherein said support member comprises a static member and a penetrating member.

54. The decoy described in claim 53, wherein said penetrating member is selected from a group consisting of an auger, a stake, and a plurality of stakes.

55. The decoy described in claim 53, wherein said static member is divided into at least two sections.

56. The decoy described in claim 49, wherein said central motor is attached to said support member and further comprises:
   (a) a central motor shaft attached to said central motor;
   (b) a central rotary arm having a distal end and a proximal end, said proximal end being attached to said central motor shaft;

(c) a fore extension rod having a first rotary end and a first anchor end, said first rotary end attached to said distal end of said central rotary arm and said first anchor end attached to said forward portion;

(d) an aft extension rod having a second rotary end and a second anchor end, said second rotary end attached to said distal end of said central rotary arm and said second anchor end attached to said rear portion;

wherein said central motor drives said central motor shaft and rotates said central rotary arm, thereby causing said fore extension rod and said aft extension rod to oscillate and producing simultaneous movements of said forward portion with respect to said rear portion and said rear portion with respect to said ground surface.

57. The decoy as described in claim 49, wherein said hinged connection is selected from the group consisting of a transverse rod and bracket connection, a flap hinge, a molded hinge, and a flexible material.

58. The decoy as described in claim 49, said decoy further comprising a remote control receiver and a remote control transmitter, said remote control receiver adapted to receive signals from said remote control transmitter from a remote distance, said remote control receiver activating said central motor in response to said signals from said remote control transmitter.

59. The decoy as described in claim 49, said decoy further comprising a multi-cycle remote control receiver and a multi-cycle remote control transmitter, said multi-cycle remote control receiver adapted to receive signals from said multi-cycle remote control transmitter from a remote distance, said multi-cycle remote control receiver activating said central motor in response to signals from said multi-cycle remote control transmitter, said multi-cycle remote control receiver and said multi-cycle remote control transmitter being further adapted to operate said central motor and move said forward portion with respect to said rear portion and said rear portion with respect to said ground surface with intermittent frequency.

60. The decoy as described in claim 49, said decoy further comprising a modulator, said modulator being adapted to operate said central motor and move said forward portion with respect to said rear portion and said rear portion with respect to said ground surface with intermittent frequency.

61. The decoy described in claim 49, wherein said decoy further comprises
(a) a tail; and
(b) a tail motor, said tail motor adapted to move said tail with respect to said rear portion.

62. The decoy described in claim 61, said decoy further comprising:
(a) a tail motor shaft attached to said tail motor; and
(b) an axial pin, said axial pin penetrating said tail and attached to said tail motor shaft to allow said tail to be rotated about said axial pin, thereby altering the angle of said tail with respect to said tail motor shaft.

63. The decoy described in claim 49, wherein said decoy further comprises detachable antlers.

64. The decoy described in claim 49, wherein said decoy further comprises a scent disperser for distributing a chemical attractant.

65. An improved motorized game decoy, said decoy comprising:
(a) a plurality of body parts simulating an animal, said animal selected from the group consisting of an ungulate animal, an armadillo, an opossum, a fox, and a coyote; and, said body parts further comprising (i) a forward portion;
(ii) a rear portion;
(iii) a tail attached to said rear portion;
(iv) at least one leg attached to said rear portion; and
(v) ears attached to said forward portion; and (b) a plurality of motors, said plurality of motors adapted to provide movement of said forward portion with respect to said rear portion and said forward portion and said rear portion with respect to a ground surface.

66. The decoy described in claim 65, wherein said plurality of motors is further adapted to provide movement of said tail with respect to said rear portion.

67. The decoy described in claim 65, wherein said plurality of motors is further adapted to provide movement of said at least one leg with respect to said rear portion.

68. The decoy described in claim 65, wherein said plurality of motors is further adapted to provide movement of said ears with respect to said forward portion.

69. A method for attracting game animals, said method comprising the acts of:
(a) providing a decoy, said decoy comprising
(i) a decoy body, said decoy body further comprising
(A) a forward portion, said forward portion simulating a head and a neck of an animal;
(B) a rear portion, said rear portion simulating a torso and legs of said animal; and
(C) a hinged connection;
wherein said animal is chosen from the group consisting of an ungulate animal, an armadillo, an opossum, a fox, and a coyote; and
(ii) a central motor; and
(b) moving said forward portion with respect to said rear portion and about said hinged connection.

70. A method for attracting game animals, said method comprising the acts of:
(a) providing a decoy, said decoy comprising:
(i) a decoy body, said decoy body further comprising
(A) a rear portion; and
(B) at least one leg attached to said rear portion, said at least one leg being hinged at one or more joints along said leg and further comprising a free end and an attached end; and
(ii) a leg motor; and
(b) moving said at least one leg in a pawing motion by bending said at least one leg along said one or more joints, wherein said free end is moved with respect to a ground surface.

71. A method for attracting game animals, said method comprising the acts of:
(a) providing a decoy, said decoy comprising:
(i) a decoy body, said decoy body further comprising
(A) a forward portion, said forward portion simulating a head and a neck of an animal;
(B) a rear portion, said rear portion simulating a torso and legs of said animal;
(C) a hinged connection between said forward portion and said rear portion; and
(D) ears; and
(ii) a ear motor; and
(b) moving said ears with respect to said forward portion.

72. A method for attracting game animals, said method comprising the acts of:
(a) providing a decoy, said decoy comprising
(i) a decoy body, said decoy body further comprising
(A) a forward portion, said forward portion simulating a head and a neck of an animal;
(B) a rear portion, said rear portion simulating a torso and legs of said animal;

(ii) a support member attached to said rear portion and attachable to a ground surface; and (iii) a central motor statically attached to body or said support member said decoy;

wherein said animal is chosen from the group consisting of an ungulate animal, an armadillo, an opossum, a fox, and a coyote; and (b) operating said central motor to provide rotation of said decoy body in its entirety with respect to said ground surface.

73. A method for attracting game animals, said method comprising the acts of (a) providing a decoy, said decoy comprising:

(i) a decoy body, said decoy body further comprising (A) a forward portion, said forward portion simulating a head and a neck of an animal;

(B) a rear portion, said rear portion simulating a torso and legs of said animal; and (C) a hinged connection;

wherein said animal is chosen from the group consisting of an ungulate animal, an armadillo, an opossum, a fox, and a coyote; and (ii) a support member attached to said rear portion and attachable to a ground surface; and (iii) a central motor;

(b) moving said forward portion with respect to said rear portion and about said hinged connection; and (c) moving said decoy body in its entirety with respect to said ground surface.

\* \* \* \* \*